Figure 1:
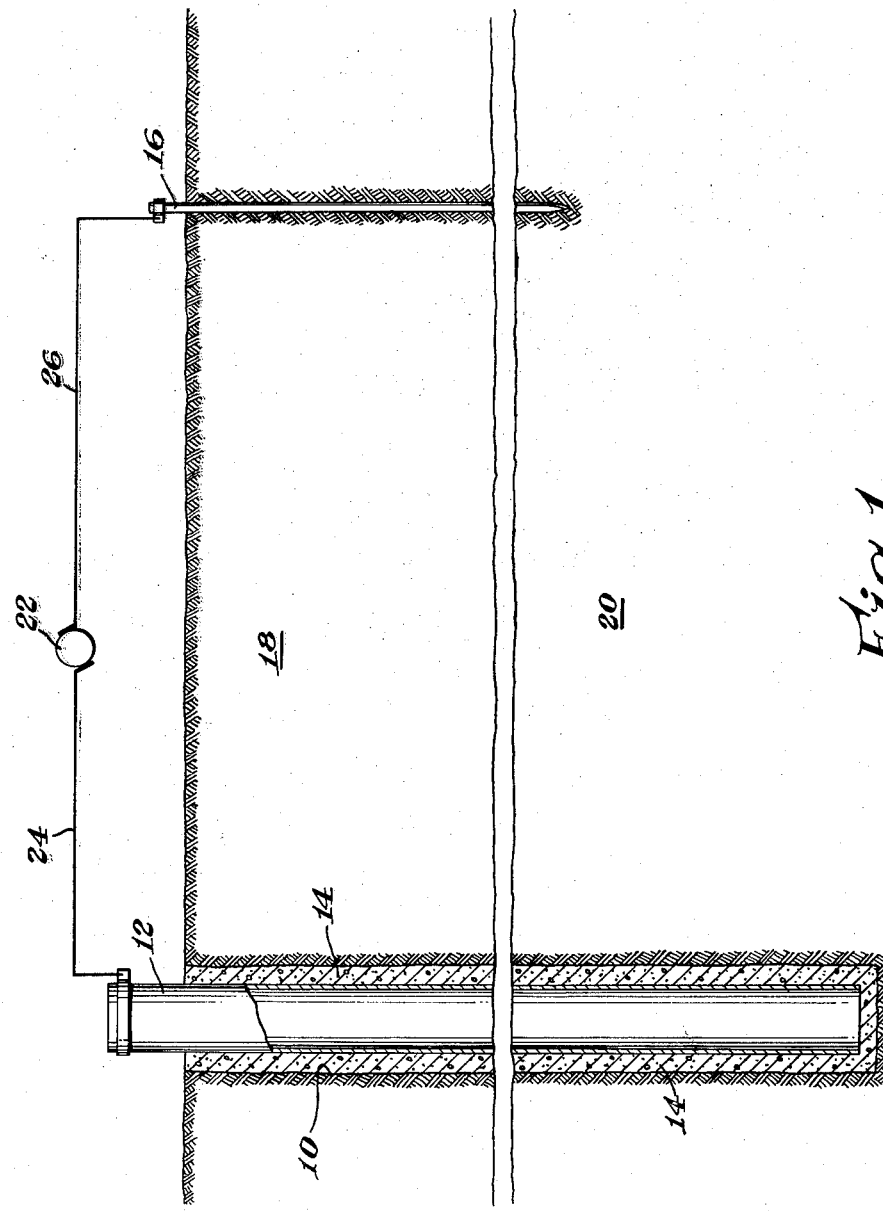

INVENTOR.
Luther C. Cronberger
BY
Earl D. Ayers
AGENT 3,189,088
WELL TREATING METHOD
Luther C. Cronberger, Tulsa, Okla., assignor to The Dow Chemical Company, Midland, Mich., a corporation of Delaware
Filed Feb. 10, 1961, Ser. No. 88,583
7 Claims. (Cl. 166—25)

This invention relates to earth well cementing operations and particularly to a method of heating an un-set cement sheath in an earth well to facilitate the setting thereof.

In many geographic areas the temperature of the earth (at depths at which the surface pipe of oil or gas wells is to be set) is too low to permit cement to set and develop required strength characteristics in a reasonable length of time.

Several methods have been used in attempts to cause the cement sheath between surface pipe or casing and the well bore wall to set rapidly. For example, additives to accelerate the setting of the cement have been used, but such additives may cause the set cement to have weaker strength characteristics than does cement not so treated.

Another alternative is to set the surface pipe at a depth where the earth temperature is high enough to permit normally rapid setting of the cement. This alternative does solve the problem, but the cost is excessive in that extra pipe and cement are required when the surface pipe is set at a greater than normal depth.

Preheating of the cement and the well before the cement is pumped down the borehole has also been done, but it is not possible to introduced a sufficient amount of heat into the system by this means to keep the cement at an effectively high temperature during the period of time required for setting of the cement.

Heaters which may be run into the interior of casing are known; such heaters make heat available to the fluid in the casing. This method of heating wells has a disadvantage because the cement sheath can become heated only as the heat is conducted through the fluid to the steel casing, thence through the casing to the sheath and thence throughout the sheath.

A principal object of this invention is to provide an improved method of elevating the temperature of an un-set cement sheath disposed between a metal pipe and the wall of an earth well to promote the rapid setting of the cement.

A more particular object is to provide a method of elevating the temperature of a cement sheath whereby most of the required heat is generated within the sheath.

A further object is to provide a means of elevating the temperature of a cement sheath to insure adequate setting at depths where water is prevalent in the earth formations penetrated by a borehole.

An additional object of this invention is to provide a method of improving the bond between the casing and the cement sheath in a borehole.

In accordance with this invention the un-set cement sheath between the well casing and well bore wall is heated by means of electrical energy. The well casing serves as one electrode and a nearby well or other suitable ground terminal serves as the other electrode. An electrical energizing source capable of passing large currents between the electrodes is connected across the two electrodes. When power is applied the distribution pattern of the resistance through the cement sheath and earth causes the cement sheath to become heated at an accelerated rate as compared with the electrodes and the earth more remote from the electrodes. When the energizing source is a D.C. generator and the well casing is connected to its positive pole improved bonding results between the casing and the cement sheath.

The invention, as well as additional objects and advantages thereof, will best be understood when the following detailed description is read in connection with the accompanying drawing in which:

FIGURE 1 of the drawing shows, in diagramamtic form, partly in section, a cased borehole in which the un-set cement sheath is heated in accordance with the invention.

Figure 2:
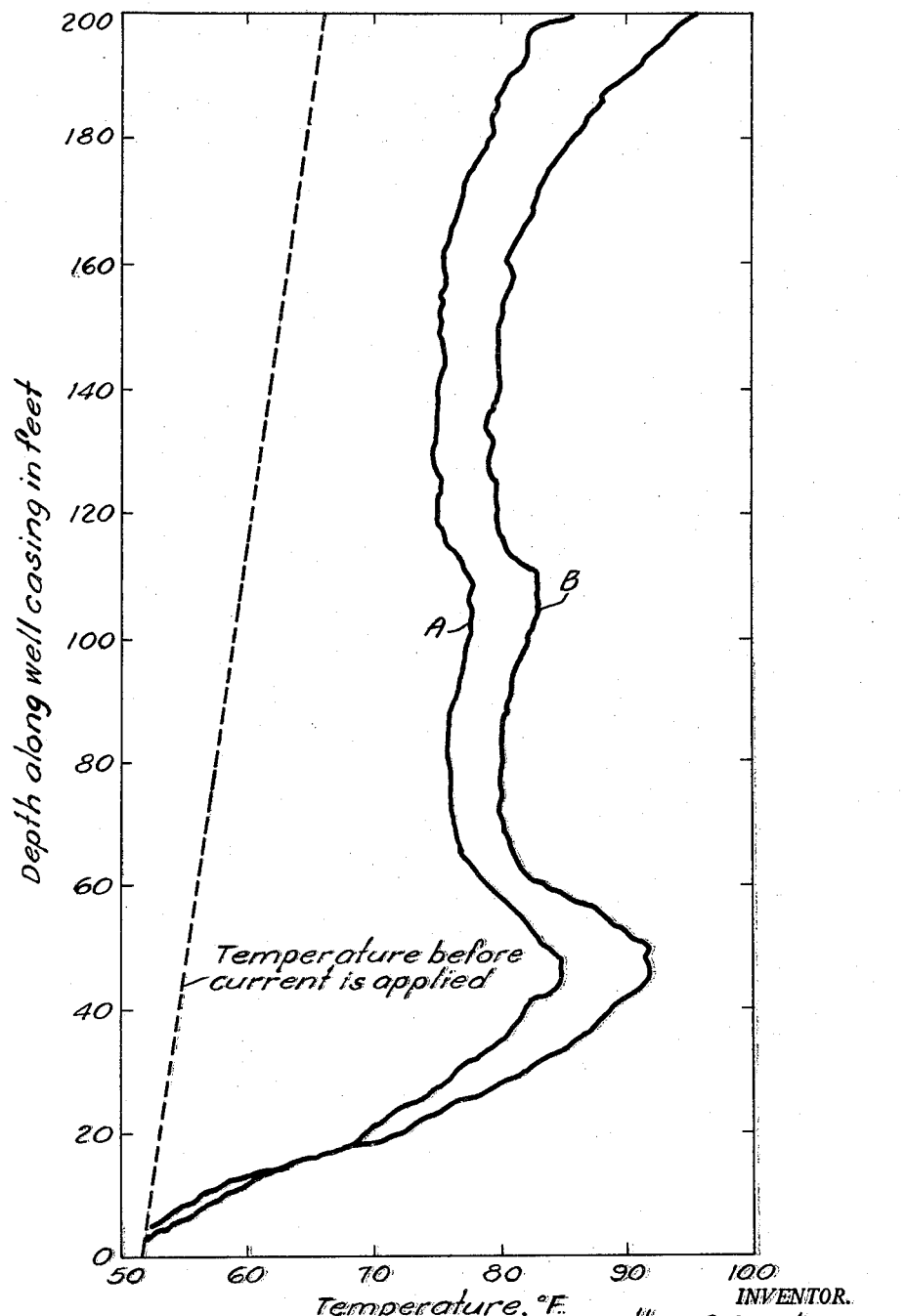

FIGURE 2 of the drawing is a copy of temperature logs made by lowering a temperature sensitive tool connected to a conductive line through a casing being cemented into a borehole. The log was produced as the temperature readings were automatically recorded for the entire length of the casing.

Referring to FIGURE 1 of the drawing, there is shown a borehole having a wall 10, casing 12 in the borehole, a sheath of un-set cement 14 disposed in the annulus between the casing and well bore wall, a remote electrode 16 extending into the earth formations 18, 20, and a source of electrical energy 22 which is coupled to the casing 12 and the remote electrode 16 through the electrical leads 24, 26.

In actual operation the remote electrode instead of extending into earth formations may be introduced into anything that has conductive continuity to the earth such as a flowing creek, pool or stream of water or other electrically conductive fluid such as brine. Also the remote electrode may be another cased earth well, or a driven or "drilled in" pipe or rod which is capable of handling very large currents and is in electrical contact with an earth formation. In a test in which the remote electrode was a city water main, current distribution along the casing of the treated well was good despite the slight depth of the water main as compared to the depth of the well casing.

In one test made in accordance with this invention, a cased well 519 feet deep was cemented and used as the test well and the casing of a second well was used as the remote electrode. The electrical resistance between the two wells, as measured through the leads used to connect a direct current generator to the wells, was about .232 ohm. The wells were connected by cables to a direct current generator and a current of 1100 amperes at 255 volts was applied for six hours. A temperature log of the well was then run and the temperature of the casing of the test well was found to have raised at least 25 degrees F. above the pre-treatment temperature for the bottom 275 feet of the casing and raised about 10 degrees F. along the rest of the casing. The greatest temperature rise along the casing occurred adjacent to the earth strata which were then best electrical conductors.

For example, the casing temperature was raised 45 degrees F. through one earth stratum and raised over 70 degrees F. through another stratum. The strata wherein the greatest increase in temperature occurred were those having the greatest water content; because of this water content it is in these strata that a strong set of the cement is most needed in order to guard against water leaking past the cement and entering the well.

Another test of the invention was made wherein 8⅝" casing was run in a 12¼" hole to a total depth of 218 feet where it was cemented in place by filling the annular space between the casing and the hole with a slurry of Portland cement. The temperature of the well was measured at the bottom and top shortly after filling the annulus with cement and, as may be seen by reference to FIGURE 2, the temperature was 66° F. and 52° F., respectively. The temperatures of the intermediate depths were not measured but are known to vary between these values approximately in proportion to the particular depth. The casing of the well was connected by cable to one lead from a direct current generator; the second lead from the generator was connected to the casing of another well 197 feet deep and 1320 feet distant. A current of 800 to 900 amperes at 560 to 570 volts was applied for four hours. The eletcrical resistance between the two wells was measured and found to vary from 0.7 to 0.62 ohm. At the end of the four hour period, a temperature log was made of the interior of the casing; curve A of FIGURE 2 shows the temperature had been raised an average of about 15° F. throughout the length of the casing, excluding the uppermost section.

The test was continued by disconnecting the second lead from the 197 foot casing and connecting it in parallel to eight sections of 2" steel pipe, four extending into the earth to a depth of 10 feet and four to a depth of 30 feet. A current of 900 to 1025 amperes at 540 to 580 volts was applied for 2⅔ hours; the resistance between the test well and the eight opposite electrodes varied from 0.64 to 0.54 ohm. A second temperature log was run; curve B of FIGURE 2 shows the temperature was increased up to 11° F. above the previous log by this stage of the test.

In the test described above in the well 519 feet deep, approximately 1100 amperes or an average of about 2 amperes per foot of well depth were flowing between the two wells. In the test described using the well 218 feet deep, over 4 amperes per foot were flowing from the well casing during some stages of the test in accordance with this invention and somewhat more rapid rises in temperature along the well casing were noted than when lesser amounts of current were used.

When the cement sheath extends along all the length of the casing which lies in the borehole, the entire casing length acts as an active electrode. When the cement sheath extends along only part of the length of the casing, the remainder of the casing may or may not act as an active electrode. For example, that part of the casing which lies above or below the cement sheath may not be in contact with adjacent electrically conductive material, either by accident or purposeful design, such as intervening insulation. Thus, the effective or active length of the casing electrode is defined as that portion of the length of the casing from which current may freely pass into the adjacent earth formation.

In the above described tests the cement sheath extended from the bottom of the casing to the surface. Thus, the entire length of the casing was an active electrode.

Other tests showed that when the applied current was about ½ ampere per foot of casing in the treated well, the cement sheath could not be heated effectively in an economically reasonable length of time. In fact, when generators of the electric welding type were used, the rise in casing temperature after several hours was only two or three degrees F. and was clearly ineffective in helping to set the cement in a short time.

Although the tests were made with direct current generating equipment, it is recognized that alternating current energy sources could be used in practicing the invention.

It has been found that a superior bond exists between the cement sheath and well casing when the casing is connected to the positive pole of the direct current generator used in the cement sheath heating operation. Apparently the accelerated corrosion of the surface of the metal casing improves the qualtity of the bond with the cement sheath.

When the cement heating and setting is accomplished with the well casing connected to the positive pole of the direct current energization source in accordance with this invention, it has been found experimentally that an application of excessive stress the bond breaks within the cement itself rather than at the casing-cement interface.

It is expected that in some treatments in accordance with this invention the temperature of the un-set cement will be initially raised to a desired temperature level by applying a high current and then, after the desired cement temperature is reached, the power will be cut back to an amount sufficient to maintain the cement within a desired temperature range until the cement is set.

While the invention has been described in connection with cement sheaths, plastic based sheaths such as phenol formaldehyde compositions, for example, may be used. Depending on the type of plastic base material used, the addition of an aqueous salt solution or of carbon black or other electrically conductive particulated materials may be necessary to adjust the resistivity of the sheath to desirable values for best heating characteristics when used in this invention.

This application is a continuation-in-part of my co-pending application Serial No. 40,788, filed July 5, 1960, now abandoned.

What is claimed is:

1. A method of reducing the setting time of an elongated un-set electrically conductive sheath in the annulus between the wall of an earth well and a string of casing disposed in said well, said sheath extending along at least a substantial part of the length of said casing, said string of casing constituting an electrode, comprising electrically connecting a source of electrical energy between said casing electrode and a ground electrode which is remote from said sheath and is contacting an earth formation, and applying in excess of one half ampere of electrical current per foot of active length of said casing electrode between said casing and said remote electrode to heat the sheath and accelerate the setting thereof.

2. A method in accordance with claim 1, wherein said sheath is cement.

3. A method in accordance with claim 1, wherein said remote ground electrode is the casing of another well.

4. A method in accordance with claim 1, wherein said remote ground electrode is a pool of electrically conductive fluid.

5. A method in accordance with claim 2, wherein electrical energy is initially applied between said casing and said electrode at a high rate to rapidly raise the temperature of the cement sheath to a desired level and then applying electrical energy at a lower rate to maintain said cement temperature within said range.

6. A method in accordance with claim 1, wherein said sheath is composed of a plastic base material.

7. A method in accordance with claim 1, wherein said casing is coupled to the positive pole of a suitable direct current energization device for at least a substantial part of the time current is applied to the casing.

References Cited by the Examiner

UNITED STATES PATENTS

| | | | |
|---|---|---|---|
| 828,976 | 8/06 | Schneider | 204—130 |
| 1,026,589 | 5/12 | Jackson | 166—25 |
| 1,372,743 | 3/21 | Gardner | 166—4 |
| 1,784,214 | 12/30 | Workman | 166—60 |
| 1,801,983 | 4/31 | Saye | 166—25 |
| 2,099,328 | 11/37 | Casagrande | 166—21 |
| 2,283,206 | 5/42 | Hayward | 166—21 |
| 2,363,269 | 11/44 | Schlumberger | 166—25 |
| 2,609,052 | 9/52 | Kantzer | 166—25 |
| 2,795,279 | 6/57 | Sarapuu | 166—39 |
| 2,818,118 | 12/57 | Dixon | 166—39 |

CHARLES E. O'CONNELL, *Primary Examiner.*

BENJAMIN BENDETT, *Examiner.*